June 19, 1928.  
C. R. CARPENTER  
1,674,033  
MACHINE FOR FORMING AND BAKING PASTRY SHELLS  
Filed June 22, 1922     2 Sheets-Sheet 1
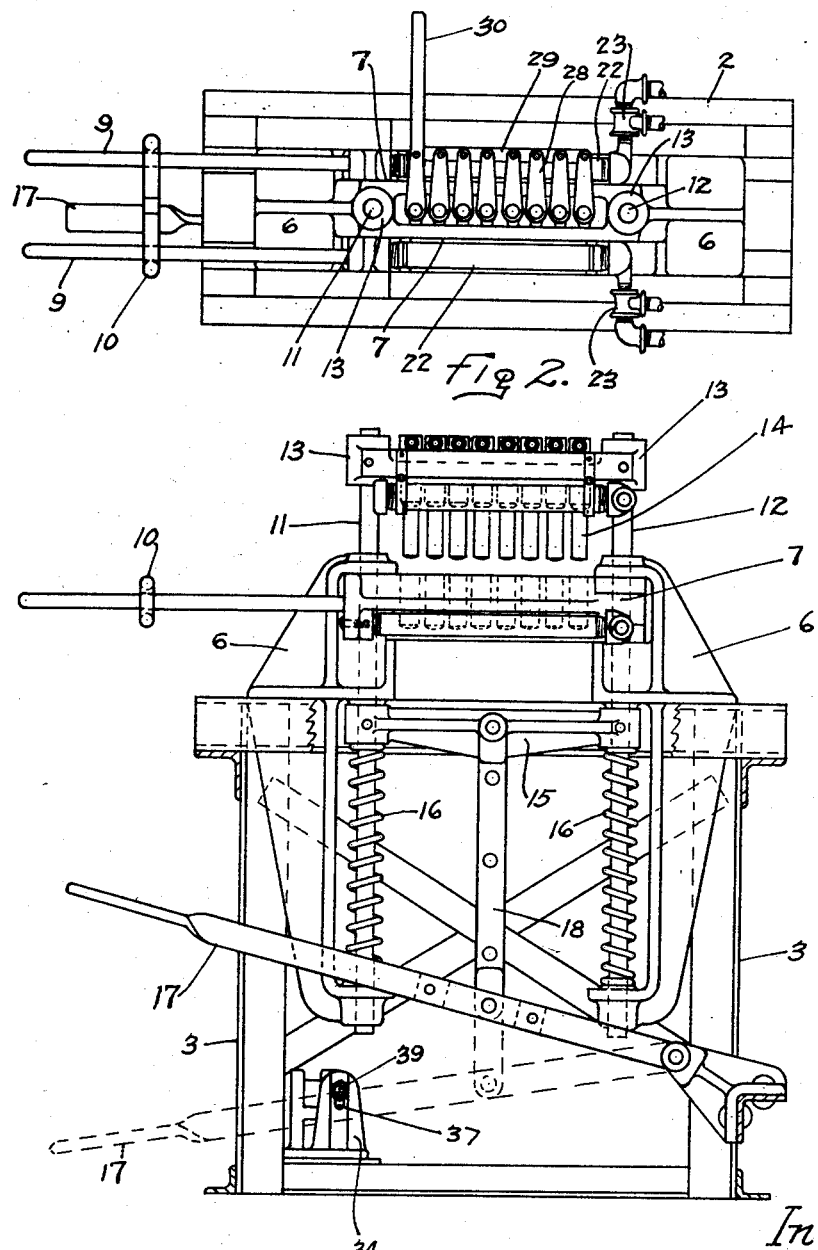
Inventor  
CHARLES R. CARPENTER  
By Paul & Paul  
ATTORNEYS

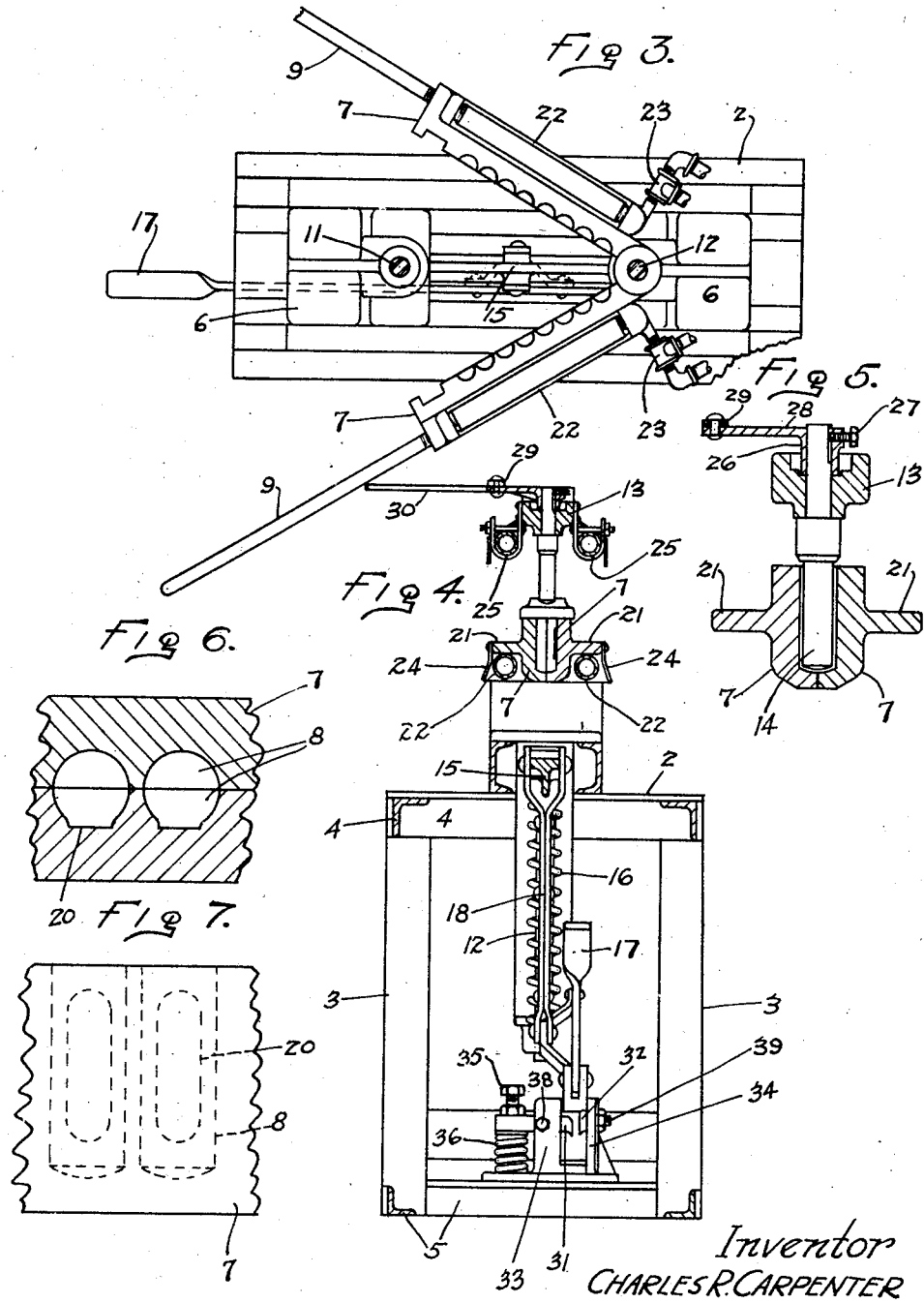

Patented June 19, 1928.

1,674,033

UNITED STATES PATENT OFFICE.

CHARLES R. CARPENTER, OF MINNEAPOLIS, MINNESOTA.

MACHINE FOR FORMING AND BAKING PASTRY SHELLS.

Application filed June 22, 1922. Serial No. 570,044.

This invention relates to improvements in machines designed for forming and baking edible pastry shells intended to be coated with chocolate or similar confectionery material, and to receive a charge or filling of ice cream or other suitable material, thereby forming a confection that can be held in the hand of the consumer while being eaten.

The object of the invention is to provide a machine that will form and bake a straight-walled shell and preferably a shell having a cylindrical, or substantially cylindrical, interior opening, with one or more flat surfaces upon its exterior, upon which the shell may rest while passing through an enrobing or coating machine for the purpose of being coated with chocolate, or similar material.

Other objects of the invention will appear from the following detailed description taken in connection with the accompanying drawings, in which Figure 1 is a plan view of a machine embodying my invention, Figure 2 is a side elevation;

Figure 3 is a plan view of the machine with the upper or reciprocating head removed;

Figure 4 is a transverse vertical section with the operating foot lever and its locking device in elevation;

Figure 5 is a detail illustrating the swinging sectional heads and the vertically reciprocating head in section, and showing one of the cores or male dies in elevation;

Figure 6 is a horizontal section of a portion of the sectional heads illustrating the outline of the molds or female dies, and showing the means for providing a flat surface on the exterior of each shell.

Figure 7 is a side elevation of the portion of the sectional heads shown in Figure 6, and showing in dotted lines the outline of the mold cavity and of the flat or plane surface on the wall of the same.

In the drawings, 2 represents the frame of the machine, which, as here shown, is preferably formed of a series of uprights 3, horizontal upper side and end bars 4, 4, and horizontal lower side and end bars 5, 5. Mounted upon the frame of the machine are the upwardly and downwardly extending brackets 6, 6. As a preferable construction, I mount upon these brackets, above the frame of the machine, the pivoted horizontally swinging separable heads 7, 7, each provided with a series of half sockets or mold cavities 8, 8, (Figure 6), whereby, when the swinging separable heads 7, 7, are brought together, a series of mold cavities or female die openings are formed in the contacting heads (Figure 6). Each of said swinging heads is provided with a forwardly extending rod 9, forming an operating handle, so that the operator by grasping the two handles can separate the heads, turning the same on their pivotal connections and bringing the parts substantially into the position shown in Figure 3 of the drawings; or the handles may be used to close the separable heads bringing them into the position shown in Figure 1 of the drawings, and the parts may then be locked in this position by sliding a link 10 over the handles 9 (Figures 1 and 2).

Vertical rods 11, 12 are mounted to slide in bearings in the upper and lower ends of the brackets 6. The rod 12 preferably forms the pivot for the horizontally swinging separable heads 7 (Figures 2 and 3). The rods 11 and 12 have secured to their upper ends a vertically reciprocating head 13. This head forms a support for the series of cores or male dies 14, one for each of the pockets or mold cavities in the separable heads 7, 7, with which cavities said cores are aligned (Figure 5).

Means are provided for holding the head 13 and the cores 14, carried thereby, normally in an elevated position, as indicated in Figure 2 of the drawing. I prefer, for this purpose to provided a cross-head 15 secured upon the rods 11 and 12 below the upper portions of the brackets 6, and engaged by spiral springs 16 which surround said rod, bearing at their lower end against the bracket 6 and at their upper end against the cross-head 15. A pivoted foot lever 17 is provided with a connecting rod 18, which connects said lever to the cross-head 15. The spring 16 will normally hold the reciprocating head and its cores in its elevated position (Figures 2, 3 and 4). By bearing down on the the lever or treadle 17, which the operator will usually do by pressing thereon with his foot, the cores 14 will be moved downward, with the reciprocating head 13, entering the mold cavities centrally, as shown in Figure 5 of the drawings, and leaving a narrow space between the core and wall of the mold cavity, in which the shell will be formed; and wherein it may be baked as hereinafter stated.

The mold cavities, or female die openings, in one of the swinging heads are preferably provided with flat surfaces upon their walls, as shown at 20 in Figure 6, and as indicated by dotted lines in Figure 7. This flattened surface in the wall of each mold cavity is principally for the purpose of forming a flat or plane surface on the exterior of the completed pastry shell, so that when said shell is to be coated with chocolate, or similar material, this flat surface may rest on the surface of the belt or carrier of a coating or enrobing machine, remaining in such position while it is passing through the machine, and is receiving such coating and able to prevent the shells from an oscillatory or rotary movement within the female molds when the male molds are revolved or oscillated. This flat surface, which is preferably so arranged that it will form a slight projection at its ends, may terminate below the top of the mold section, as indicated in the dotted lines in Figure 7, in which case it will serve to hold the shell in the mold, and prevent it sliding upward with the core when the same is withdrawn from the shell after the baking operation. If preferred, however, this flat surface may extend to the top of the mold cavity.

Each of the separable heads 7 is preferably provided with an outwardly and horizontally extending flange 21, and I prefer to secure to the head a short pipe gas burner 22, extending lengthwise of the separable head outside of the wall thereof, and swinging with said head, and provided with pipe connections 23 for supplying gas to said burner. If preferred an enclosing plate 24 may be secured to the edge of the flange 21 projecting downwardly and partly enclosing said burner; and aiding in concentrating the heat of the burner upon the walls of the separable head.

I also prefer to provide one or more similar burners 25, secured to the vertically movable head 13 opposite the cores 14 (Figure 4) and arranged to direct a flame against said cores when the head is elevated to the position shown in Figure 4, and to direct the flame against the cores and the outer surface of the separable head above the flange 21, when the reciprocating head 13 is lowered into the forming and baking position shown in Figure 5.

I also prefer, in some instances, to mount the cores 14 in the head 13, so that the same will be capable of an oscillatory movement upon their axes. I have shown a construction adapted for this purpose in Figure 5 in which the upper part of the core is of reduced diameter and is fitted to turn in the opening in the head 13. The core is held in position by means of a collar 26 secured upon said core by a set-screw 27. This collar preferably has an arm 28 projecting horizontally, and a rod 29 is connected to the ends of said arm; one of the arms is extended to form a handle or lever 30. By grasping the lever 30, and moving the same from side to side, the operator may swing all of the arms 28 and impart an oscillatory movement to the cores 14 in the mold cavity. This will loosen the cores in the completed shells, and prevent adhesion of the shells to the cores when the cores are raised. While I consider this a desirable feature of my invention I do not limit myself to the use of the oscillatory core as the same may be stationary in the reciprocating head if preferred.

While I have shown the mold sections with a single flat surface so as to form a single flat or plane surface on the exterior of each shell, it is not essential that this flat surface shall be continuous, but two or more shorter flat surfaces will serve the same purpose as the single, long, flat surface illustrated in the drawing.

The flat surface, or surfaces, on the exterior of the shells in addition to serving to retain the shell in position while passing through the coating and enrobing machine, and also preventing the shell from being lifted out of the mold cavity when the core is raised, as hereinbefore described, also serves to prevent the shell from turning in the mold cavity with the core when the cores are oscillated upon their axes by the means illustrated in the drawings.

I prefer to form the cores 14 of a material that is a better heat conductor than the material forming the heads 7, 7, in order that the heat may be transmitted to the extreme lower ends of the cores with sufficient rapidity to complete the baking of the lower inner portion of the shell, simultaneously with the baking of the other portions.

Any suitable means may be employed for locking the foot lever 17 in the depressed position shown by dotted lines in Figure 2. I have here shown two catches, between the ends of which the foot lever is moved in depressing the same. The catch 31 is pivoted at 38 in a standard 33 and its outer end is engaged by a spring 36. Said catch is provided with a screw 35 to regulate the tension of the spring. The other catch 32 is secured by a threaded bolt and nut in a slot 37, in standard 34, and is rigidly held in any position to which it is adjusted. When the cores are first thrust downward into the mold cavities a small amount of steam will be formed from the moisture in the batter or dough from which the shells are formed, and it is desirable that the head carrying the cores shall be capable of a slight upward movement to permit the escape of the steam. Hence the catch 31 is made yielding so as to permit such movement. The operator in depressing the foot lever will usually engage it, first, with the yielding latch 31, and after leaving it there, for a very short time, will move it over into connection with the stationary latch 32.

In operating the machine the burners will ordinarily be kept lighted as long as the machine is being used. A small amount of liquid dough or batter will be poured into each mold cavity. The heads 7 will have their faces in contact with each other and said heads being locked together by the link 10 sliding on the handles 9, 9. Immediately after the batter is poured into the mold cavities the reciprocating head will be depressed, forcing the cores into the mold cavities, and causing the batter in said cavities to pass upward between the inner wall of the mold cavity and the outer wall of the core.

The heat supplied by the burners not only heats the heads 7, containing the mold cavities, but the heat from the burner or burners on the reciprocating head is applied directly to the cores above the mold cavities, and is transmitted downward through the cores into contact with the entire interior surfaces of the shells being formed. By this means the shells will be quickly baked, and when this has been accomplished the operator may, if he deems it necessary, oscillate the cores, (if the machine is supplied with the core oscillating device), and the reciprocating head will then be raised, moving the cores upward and out of the shells. The movable heads are then separated and the finished shells removed therefrom.

Any number of mold cavities may be provided and considerable variation, such as suitable ornamentation, may be permitted on the exterior surfaces of the shells. The internal openings in the shells should, however, be cylindrical, or of substantially uniform diameter throughout, so that after the shells are coated, and when the retailer desires to fill or charge them with ice cream or similar material, the charge can be forced from a suitable gun or filler into the interior of the shell, where it will substantially fill the entire interior.

The details of construction may be varied to a considerable extent, without departing from my invention.

I claim as my invention:

1. The combination, in a machine of the class described, with a suitable frame, of a pair of separable heads, each provided with a series of half-mold cavities having straight walls, whereby said cavities, when brought together, form molds of substantially uniform diameter throughout their length, means for moving said heads into and out of contact with each other, a reciprocating head carrying a series of straight-walled cores, corresponding in outline to said mold cavities, means for simultaneously oscillating the cores also carried by and movable with said head and supported opposite said cavities, means for moving the reciprocating head, and bringing the cores carried thereby into operative positions in said mold cavities, and means for heating said separable heads and said cores, substantially as described.

2. The combination, in a machine of the class described, with a suitable frame, of horizontally moving separable heads, each provided with a series of half mold cavities having straight walls, whereby said cavities, when said heads are brought together, form molds of substantially uniform diameter throughout their length, means for moving said separable heads into and out of contact with each other, a vertically reciprocating head carrying a series of straight-walled cores corresponding in outline to said cavities, means for moving the reciprocating head, and bringing the cores carried thereby into operative position in said mold cavities, means for heating said separable heads, means for heating said cores, and means to prevent the shells from rotating or oscillating within the mold, substantially as described.

3. The combination, in a machine of the class described, with a suitable frame, of pivotally supported, horizontally swinging separable heads, each provided with a series of half mold cavities having straight walls, a vertically reciprocating head carrying a series of straight walled cores, corresponding in outline to said mold cavities, and arranged above said separable heads, posts on which said core head is carried, one of the posts serving as the pivot for the mold heads, means for depressing said reciprocating head and bringing the cores carried thereby into operative position in said mold cavities, and means for heating said separable heads and said cores, substantially as described.

4. The combination, in a machine of the class described, with a suitable frame, of a pair of separable heads, each provided with a series of half-mold cavities having straight walls, whereby said cavities, when brought together, form molds of substantially uniform diameter throughout their length, each mold having a flat surface in its wall extending lengthwise of the mold, means for moving said head to close or open said mold, a reciprocating head carrying a corresponding series of straight-wall cores, means for supporting and guiding said reciprocating head to bring the cores carried thereby into operative positions in said molds, and means for heating said heads and said cores.

5. The combination in a machine of the class described with a suitable frame, a pair of separable heads, each provided with a series of half mold cavities having straight walls, whereby said cavities when brought together, form molds of substantially uniform diameter throughout their length, each mold having a flat surface in its wall extending lengthwise of the mold, means for moving said head to close or open said mold, a reciprocating head carrying a corresponding series of straight wall cylindrical cores, means for supporting and guiding said reciprocating head to bring the cores carried thereby into operative positions in said molds, means to oscillate the cores, and means for heating said heads and said cores.

In witness whereof, I have hereunto set my hand this 19th day of June, 1922.

CHARLES R. CARPENTER.